(12) United States Patent
Tsuchihashi et al.

(10) Patent No.: US 11,329,540 B2
(45) Date of Patent: May 10, 2022

(54) ACTUATOR

(71) Applicant: NIDEC SANKYO CORPORATION, Nagano (JP)

(72) Inventors: Masao Tsuchihashi, Nagano (JP); Tadashi Takeda, Nagano (JP); Hiroshi Kitahara, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 426 days.

(21) Appl. No.: 16/369,646

(22) Filed: Mar. 29, 2019

(65) Prior Publication Data

US 2019/0305660 A1     Oct. 3, 2019

(30) Foreign Application Priority Data

Mar. 30, 2018  (JP) .............................. JP2018-068096

(51) Int. Cl.
| | | |
|---|---|---|
| *H02K 33/16* | (2006.01) | |
| *H02K 7/065* | (2006.01) | |
| *H02K 33/06* | (2006.01) | |
| *B06B 1/04* | (2006.01) | |

(52) U.S. Cl.
CPC ............. *H02K 33/16* (2013.01); *B06B 1/045* (2013.01); *H02K 7/065* (2013.01); *H02K 33/06* (2013.01)

(58) Field of Classification Search
CPC ........ H02K 33/02; H02K 33/04; H02K 33/18; H02K 33/06; H02K 33/08; H02K 33/10; H02K 33/16; H02K 35/02; H02K 33/00; H02K 33/12; H02K 7/065; H02K 1/34; B06B 1/045

USPC .......................................................... 310/15
See application file for complete search history.

(56) References Cited

U.S. PATENT DOCUMENTS

| | | | | |
|---|---|---|---|---|
| 2006/0261684 | A1* | 11/2006 | Sonohara | ............... H02K 5/225 |
| | | | | 310/49.08 |
| 2017/0310203 | A1* | 10/2017 | Takeda | .................... B06B 1/045 |
| 2017/0373579 | A1* | 12/2017 | Goncalves | ............... H02K 9/22 |

FOREIGN PATENT DOCUMENTS

JP        2016127789 A       7/2016

\* cited by examiner

*Primary Examiner* — Tulsidas C Patel
*Assistant Examiner* — Robert E Mates
(74) *Attorney, Agent, or Firm* — Cantor Colburn LLP

(57) ABSTRACT

An actuator may include a movable body; a support body; a connecting body arranged where the movable body and the support body face each other to contact both of the movable body and the support body; and a magnetic drive circuit. The magnetic drive circuit may include an air-core coil provided on a first-side member among the movable body and the support body; and a permanent magnet provided on a second-side member among the movable body and the support body to face the coil in a first direction, the magnetic drive circuit being configured to vibrate the movable body with respect to the support body in a second direction crossing the first direction. In the first-side member, the coil may be fixed by an adhesive to a surface of a plate-shaped coil holder on a first side in the first direction while an air-cores is directed in the first direction.

22 Claims, 7 Drawing Sheets

ACTUATOR

CROSS REFERENCE TO RELATED APPLICATION

The present application claims priority under 35 U.S.C. § 119 to Japanese Application No. 2018-068096 filed Mar. 30, 2018, the entire content of which is incorporated herein by reference.

BACKGROUND

Field of the Invention

At least an embodiment of the present invention relates to an actuator configured to vibrate a movable body.

Description of the Related Documents

An actuator including: a movable body having a permanent magnet; and a support body having a coil facing the permanent magnet has been proposed as a device configured to notify information by vibration. In the support body, the coil is arranged in a coil arrangement hole penetrating a coil holder (see Japanese Unexamined Patent Application Publication No. 2016-127789, hereinafter, referred to as Patent Literature 1).

SUMMARY

As in the configuration in Patent Literature 1, in a configuration in which the coil is arranged in the coil arrangement hole penetrating the coil holder, it is necessary to pour adhesive in a gap formed between an inner peripheral surface of the coil arrangement hole and an outer peripheral surface of the coil when the coil is arranged inside the coil arrangement hole, so that the coil adheres to the coil holder. However, since the coil is manufactured by winding a coil wire, dimensions of an outer diameter are likely to vary, and thus a width of the gap between the inner peripheral surface of the coil arrangement hole and the outer peripheral surface of the coil is likely to vary. Thus, even if a fixed amount of adhesive is poured into the gap, it is difficult to properly fill the gap with the adhesive. Therefore, if there is too much adhesive compared to the width of the gap, the adhesive flows from the gap to the outside and on the other hand, if there is too little adhesive compared to the width of the gap, an adhesive strength between the coil and the coil holder decreases.

In view of the problems mentioned above, an object of at least an embodiment of the present invention is to provide an actuator capable of properly fixing a coil to a coil holder by adhesion.

In order to solve the problems mentioned above, an actuator to which at least an embodiment of the present invention is applied includes: a movable body; a support body; a connecting body having at least one of elasticity and viscoelasticity and arranged at a position where the movable body and the support body face each other to contact both the movable body and the support body; and a magnetic drive circuit including an air-core coil provided on a one-side member among the movable body and the support body and a permanent magnet provided on an other-side member among the movable body and the support body to face the coil in the first direction, the magnetic drive circuit being configured to vibrate the movable body with respect to the support body in a second direction crossing a first direction.

In the one-side member, the coil is fixed by an adhesive to a surface of a plate-shaped coil holder on one side in the first direction while an air-core is directed in the first direction.

In at least an embodiment of the present invention, the coil is fixed on the surface of the coil holder on the one side in the first direction while the air-core is directed in the first direction, and thus even if an outer diameter and the like of the coils vary, the coil can be properly fixed to the coil holder by an adhesive. Also, in this case, the coil holder has a plate shape, and thus the size of the actuator in the first direction can be reduced.

In at least an embodiment of the present invention, it is possible to adopt an aspect where the coil holder is formed of a non-magnetic material. According to such an aspect, the magnetic flux from the permanent magnet is interlinked to the coil without being affected by the coil holder.

In at least an embodiment of the present invention, it is possible to adopt an aspect where the coil holder is formed of a metal plate. According to such an aspect, the heat generated by the coil can be efficiently released via the coil holder.

In at least an embodiment of the present invention, it is possible to adopt an aspect where the coil holder is formed of a stainless steel plate. According to such an aspect, the coil holder has sufficient strength even if the plate thickness is small.

In at least an embodiment of the present invention, it is possible to adopt an aspect where an end of the coil holder is bent in the first direction to form a bend portion for reinforcement. According to such an aspect, the coil holder has high strength, even if the coil holder has a plate shape.

In at least an embodiment of the present invention, it is possible to adopt an aspect where a rib-shaped convexity protruding to the one side or the other side in the first direction extends in the coil holder. According to such an aspect, the coil holder has high strength, even if the coil holder has a plate shape.

In at least an embodiment of the present invention, it is possible to adopt an aspect where a first positioning hole overlapping with an end of the air-core on one side in a third direction crossing the first direction and the second direction and a second positioning hole overlapping with an end of the air-core on the other side in the third direction are provided in the coil holder. According to such an aspect, the coil can be fixed at a proper position of the coil holder by passing a pin-shaped jig through the first positioning hole and the second positioning hole.

In at least an embodiment of the present invention, it is possible to adopt an aspect where the permanent magnet includes a first permanent magnet facing the coils on the other side in the first direction via the coil holder. According to such an aspect, even if the movable body moves in the first direction due to a shock from the outside or the like, the first permanent magnet and the coil do not come into direct contact, and thus the coil is not easily damaged.

In at least an embodiment of the present invention, it is possible to adopt an aspect where the other-side member includes a first yoke a surface thereof the one side in the first direction, where the surface is fixed with the first permanent magnet.

In at least an embodiment of the present invention, it is possible to adopt an aspect where the permanent magnet includes a second permanent magnet facing the coil on the one side in the first direction.

In at least an embodiment of the present invention, it is possible to adopt an aspect where the other-side member includes a second yoke with a surface thereof on the other side in the first direction, where the surface is fixed with the second permanent magnet.

In at least an embodiment of the present invention, it is possible to adopt an aspect where the coil holder includes a plate-shaped abutting unit bent from the coil to the side of the second yoke. According to such an aspect, even if the movable body moves in the first direction due to a shock from the outside or the like, the second permanent magnet and the coil do not come into contact, and thus the coil is not easily damaged.

In at least an embodiment of the present invention, it is possible to adopt an aspect where the connecting body is a viscoelastic member arranged at a position where the movable body and the support body face each other in the first direction. According to such an aspect, the connecting body deforms in a direction (shear direction) crossing a thickness direction (first direction), and thus exhibits a deformation characteristic where a linear component (spring coefficient) is larger than a nonlinear component (spring coefficient). Therefore, it is possible to improve a reproducibility of a vibration acceleration for an input signal, so that it is possible to achieve vibration with subtle nuances.

In at least an embodiment of the present invention, it is possible to adopt an aspect where the connecting body adheres to both the support body and the movable body. According to such an aspect, the connecting body surely follows the movement of the movable body, and thus a resonance of the movable body can be effectively prevented.

In at least an embodiment of the present invention, it is possible to adopt an aspect where the connecting body is arranged in a compressed state in the first direction. According to such an aspect, the connecting body surely follows the movement of the movable body, and thus the resonance of the movable body can be effectively prevented.

In at least an embodiment of the present invention, it is possible to adopt an aspect where the one-side member is the support body and the other-side member is the movable body. That is, it is possible to adopt an aspect where the coil is provided on the support body and the permanent magnet is provided on the movable body.

In at least an embodiment of the present invention, it is possible to adopt an aspect where the support body includes a cover configured to hold an end of the coil holder.

In at least an embodiment of the present invention, it is possible to adopt an aspect where the support body includes a first cover member configured to support the end of the coil holder from the one side in the first direction, and a second cover member configured to hold the end of the coil holder from the other side in the first direction.

In at least an embodiment of the present invention, the coil is fixed on the surface of the coil holder on the one side in the first direction while the air-core is directed in the first direction, and thus even if an outer diameter and the like of the coil vary, the coil can be properly fixed to the coil holder by an adhesive. Also, in this case, the coil holder has a plate shape, and thus the size of the actuator in the first direction is small.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
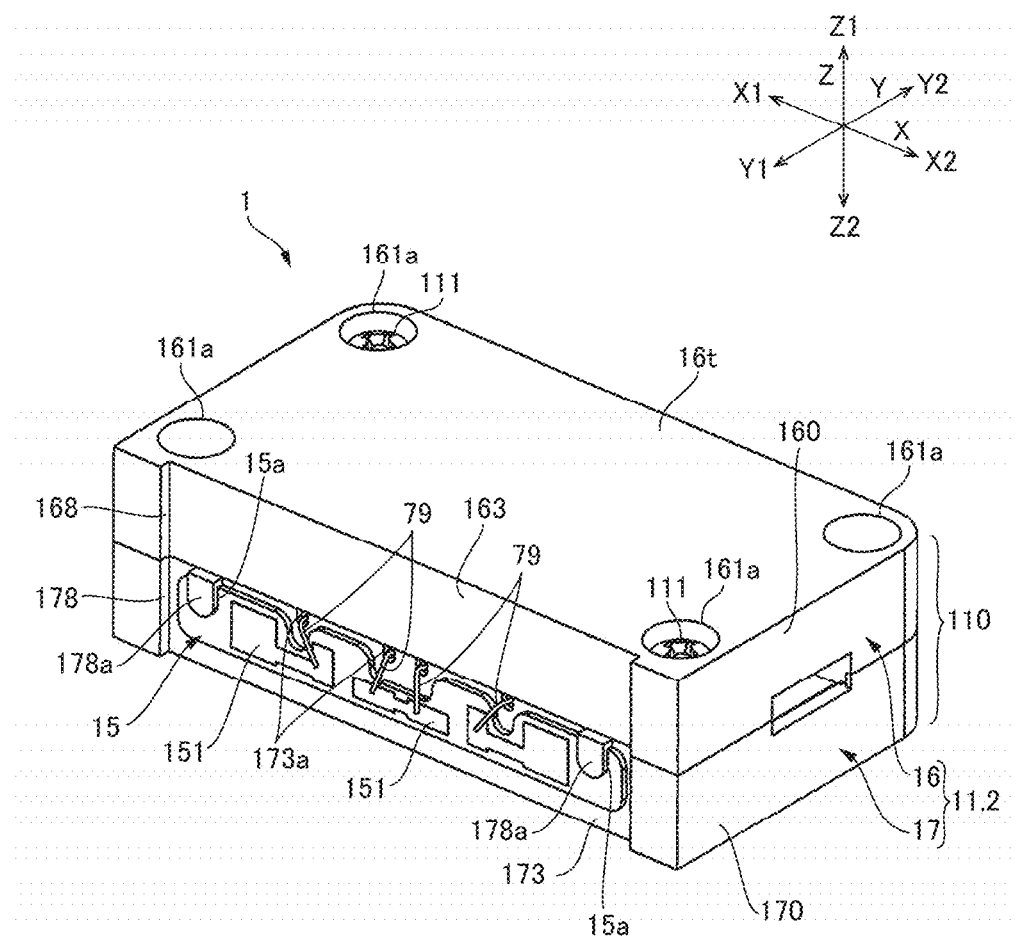
FIG. 1 is a perspective view of an actuator according to an embodiment of the present invention.

An embodiment of the present invention will be described with reference to the drawings. It is noted that, in the following description, three directions crossing each other will be described as a first direction Z, a second direction X, and a third direction Y, respectively. In the present embodiment, the first direction Z, the second direction X, and the third direction Y are directions perpendicular to each other. Further, description proceeds where X1 is allotted to one side in the second direction X, X2 is allotted to the other side in the second direction X, Y1 is allotted to one side in the third direction Y, Y2 is allotted to the other side in the third direction Y, Z1 is allotted to one side in the first direction Z, and Z2 is allotted to the other side in the first direction Z.

Further, an actuator 1 to which at least an embodiment of the present invention is applied includes a magnetic drive circuit 6 configured to move a movable body 3 relative to a support body 2, and the magnetic drive circuit 6 includes a coil 7 and a permanent magnet 8. In the magnetic drive circuit 6, an aspect where the coil 7 is provided on the side of the support body 2 (one-side member) and the permanent magnet 8 is provided on the side of the movable body 3 (other-side member) and an aspect where the permanent magnet 8 is provided on the side of the support body 2 (other-side member) and the coil 7 is provided on the side of the movable body 3 (one-side member) can be adopted. In the following description, the aspect where the coil 7 is provided on the side of the support body 2 and the permanent magnet 8 is provided on the side of the movable body 3 will be mainly described.

(Overall Configuration)

Figure 2:
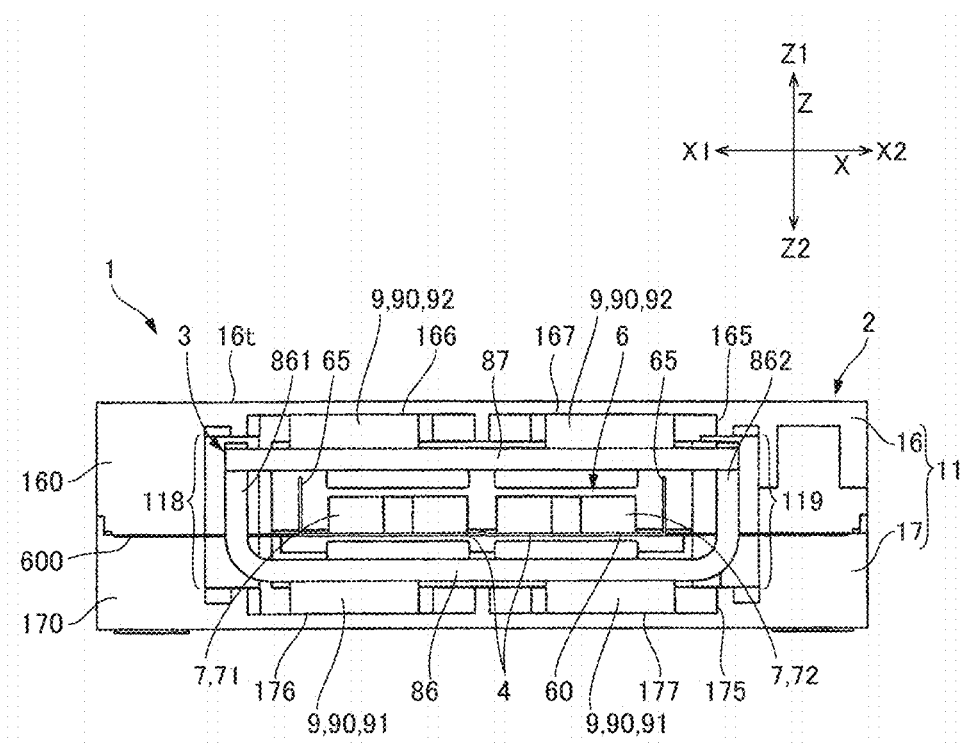
FIG. 2 is a sectional view of the actuator illustrated in FIG. 1.
Figure 3:
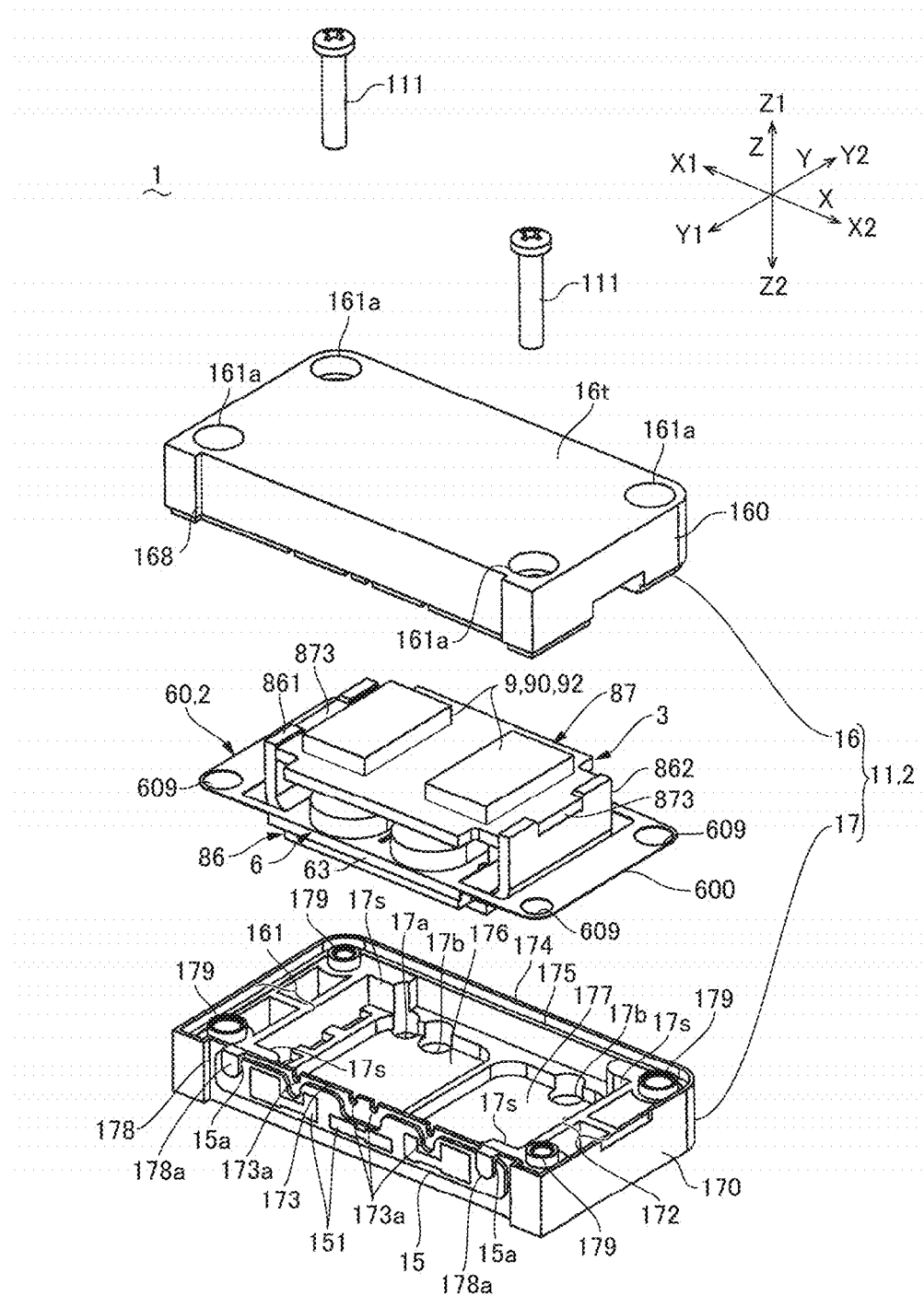
FIG. 3 is an exploded perspective view of the actuator illustrated in FIG. 1 seen from one side in a first direction.
Figure 4:
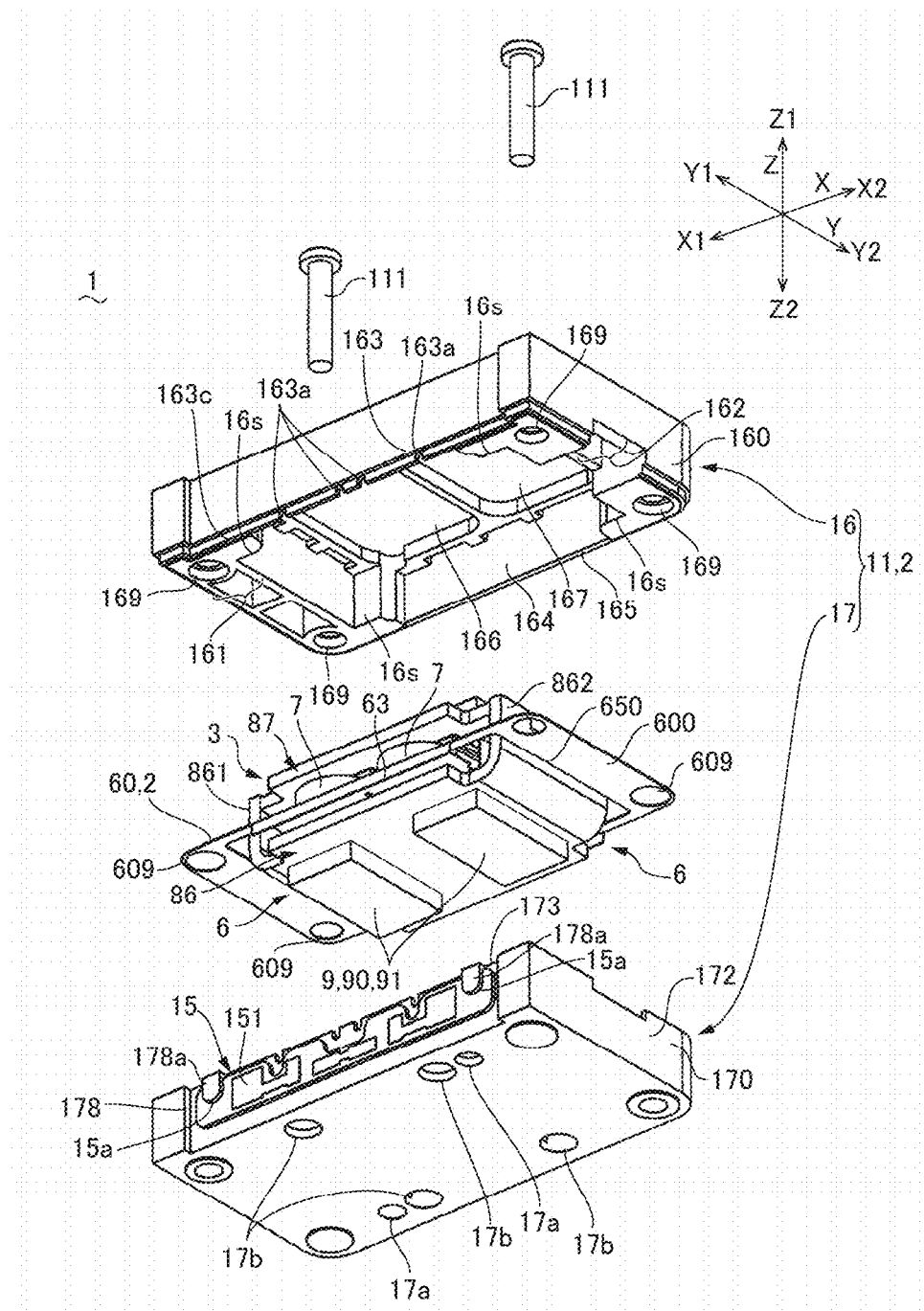
FIG. 4 is an exploded perspective view of the actuator illustrated in FIG. 1 seen from the other side in the first direction.

FIG. 1 is a perspective view of the actuator 1 according to an embodiment of the present invention. FIG. 2 is an X-Z sectional view of the actuator 1 illustrated in FIG. 1. FIG. 3 is an exploded perspective view of the actuator 1 illustrated in FIG. 1 seen from the one side Z1 in the first direction Z. FIG. 4 is an exploded perspective view of the actuator 1 illustrated in FIG. 1 seen from the other side Z2 in the first direction Z.

As illustrated in FIG. 1 and FIG. 2, the actuator 1 according to the present embodiment has a rectangular parallelepiped shape as a whole in which a dimension in the second direction X is larger than a dimension in the third direction Y. Further, as illustrated in FIG. 2, the actuator 1 includes the support body 2, the movable body 3 movably supported by the support body 2, and the magnetic drive circuit 6 configured to move the movable body 3 relative to the support body 2. The magnetic drive circuit 6 is configured to vibrate the movable body 3 in the second direction X.

As illustrated in FIG. 1, FIG. 2, FIG. 3, and FIG. 4, the support body 2 includes a cover 11 and a coil holder 60, and the movable body 3 and the magnetic drive circuit 6 illustrated in FIG. 2 are arranged inside the cover 11. The cover 11 includes a first cover member 16 positioned on the one side Z1 in the first direction Z and a second cover member 17 overlapping with the first cover member 16 from the other side Z2 in the first direction Z, and the first cover member 16 and the second cover member 17 have a rectangular planar shape. The coil holder 60 having a rectangular planar shape is arranged between the first cover member 16 and the second cover member 17, and an end 160 of the first cover member 16, an end 600 of the coil holder 60, and an end 170 of the second cover member 17 overlap in the first direction Z.

At the end 170 of the second cover member 17, cylindrical units 179 protrude from the four corners into the first direction Z, and each of the cylindrical units 179 penetrates a hole 609 formed at the end 600 of the coil holder 60 and fits into a hole 169 formed at the end 160 of the first cover member 16. In this state, the first cover member 16 and the second cover member 17 are coupled by screws 111 fastened to two of the cylindrical units 179 located at diagonal corners of the second cover member 17 from the one side Z1 in the first direction Z. Here, on a surface 16t of the first cover member 16 on the one side Z1 in the first direction Z, the periphery of the hole 169 forms a concavity 161a. Thus, the head of each of the screws 111 does not protrude from the first cover member 16 toward the one side Z1 in the first direction Z. It is noted that, among the four holes 169 of the first cover member 16 and the cylindrical units 179 of the second cover member 17, except for a part where the screws 111 are fastened, a screw (not illustrated) is fastened for fastening to a frame of a device when the actuator 1 is mounted in various types of devices.

The end 600 of the coil holder 60 is located inside of the end 160 of the first cover member 16 and the end 170 of the second cover member 17. Therefore, an outer surface side 110 of the cover 11 is constituted of the end 160 of the first cover member 16, the end 600 of the coil holder 60, and the end 170 of the second cover member 17.

(Configuration of Second Cover Member 17)

As illustrated in FIG. 3 and FIG. 4, a rectangular concavity 175 opening toward the one side Z1 in the first direction Z is formed in the second cover member 17. Further, two concavities 176 and 177 arranged next to each other in the second direction X are formed at a bottom of the concavity 175. Through holes 17a are formed at diagonal positions of the concavity 175. That is, in the concavity 175, the through holes 17a are formed at corner portions located on the one side X1 in the second direction X and on the other side Y2 in the third direction Y and at corner portions located on the other side X2 in the second direction X and the one side Y1 in the third direction Y. Further, through holes 17b are formed at both ends of the concavities 176 and 177 in the third direction Y. The through holes 17a and 17b are holes for inserting pin-shaped jigs during an assembly process. More specifically, when the actuator 1 is assembled, the position of the movable body 3 is adjusted by jigs inserted from the through holes 17a, while supporting the movable body 3 with jigs inserted from the through holes 17b.

The concavity 175 in the second cover member 17 is surrounded by a first wall unit 171 located on the one side X1 in the second direction X, a second wall unit 172 located on the other side X2 in the second direction X, a third wall unit 173 located on the one side Y1 in the third direction Y, and a fourth wall unit 174 located on the other side Y2 in the third direction Y. When seen from the first direction Z, the width between the first wall unit 171 and the second wall unit 172 (dimension in the second direction X) is wider than the width between the third wall unit 173 and the fourth wall unit 174 (dimension in the third direction Y). A concavity 178 extending along the second direction X is formed on the outer surface of the third wall unit 173.

Further, total four notches 173a are formed on the edge of the third wall unit 173 on the one side Z1 in the first direction Z. Further, convexities 178a protruding to the one side Y1 in the third direction Y are formed at two positions spaced apart in the second direction X from the bottom of the concavity 178 formed on the third wall unit 173.

In the second cover member 17 configured thus, a power supply substrate 15 is fixed to the concavity 178 by a method such as adhesion. At this time, the convexities 178a fit into notches 15a formed in the power supply substrate 15, and thus the power supply substrate 15 is positioned. Coil wires 79 (refer to FIG. 1) drawn out from later-described coils 7 and lands 151 to which a power supply line from the outside is connected are formed on the power supply substrate 15. The coil wires 79 are drawn out toward the power supply substrate 15 via the notches 173a of the third wall unit 173.

(Configuration of First Cover Member 16)

A rectangular concavity 165 opening toward the one side Z1 in the first direction Z is formed in the first cover member 16. Further, two concavities 166 and 167 arranged next to each other in the second direction X are formed at a bottom of the concavity 165. The concavity 165 in the first cover member 16 is surrounded by a first wall unit 161 located on the one side X1 in the second direction X, a second wall unit 162 located on the other side X2 in the second direction X, a third wall unit 163 located on the one side Y1 in the third direction Y, and a fourth wall unit 164 located on the other side Y2 in the third direction Y. When seen from the first direction Z, the width between the first wall unit 161 and the second wall unit 162 (dimension in the second direction X) is wider than the width between the third wall unit 163 and the fourth wall unit 164 (dimension in the third direction Y). A concavity 168 extending along the second direction X is formed on the outer surface of the third wall unit 163.

Here, a portion of the third wall unit 163 on the other side Z2 in the first direction Z is a thin plate 163c and when the first cover member 16 and the second cover member 17 overlap, the thin plate 163c fits inside the third wall unit 173 of the second cover member 17. Therefore, notches 163a overlapping with the notches 173a of the third wall unit 173 are formed in the thin plate 163c, and the coil wires 79 are drawn out through the notches 163a of the third wall unit 163 and the notches 173a of the third wall unit 173 toward the power supply substrate 15.

(Configuration of Magnetic Drive Circuit 6)

Figure 5:
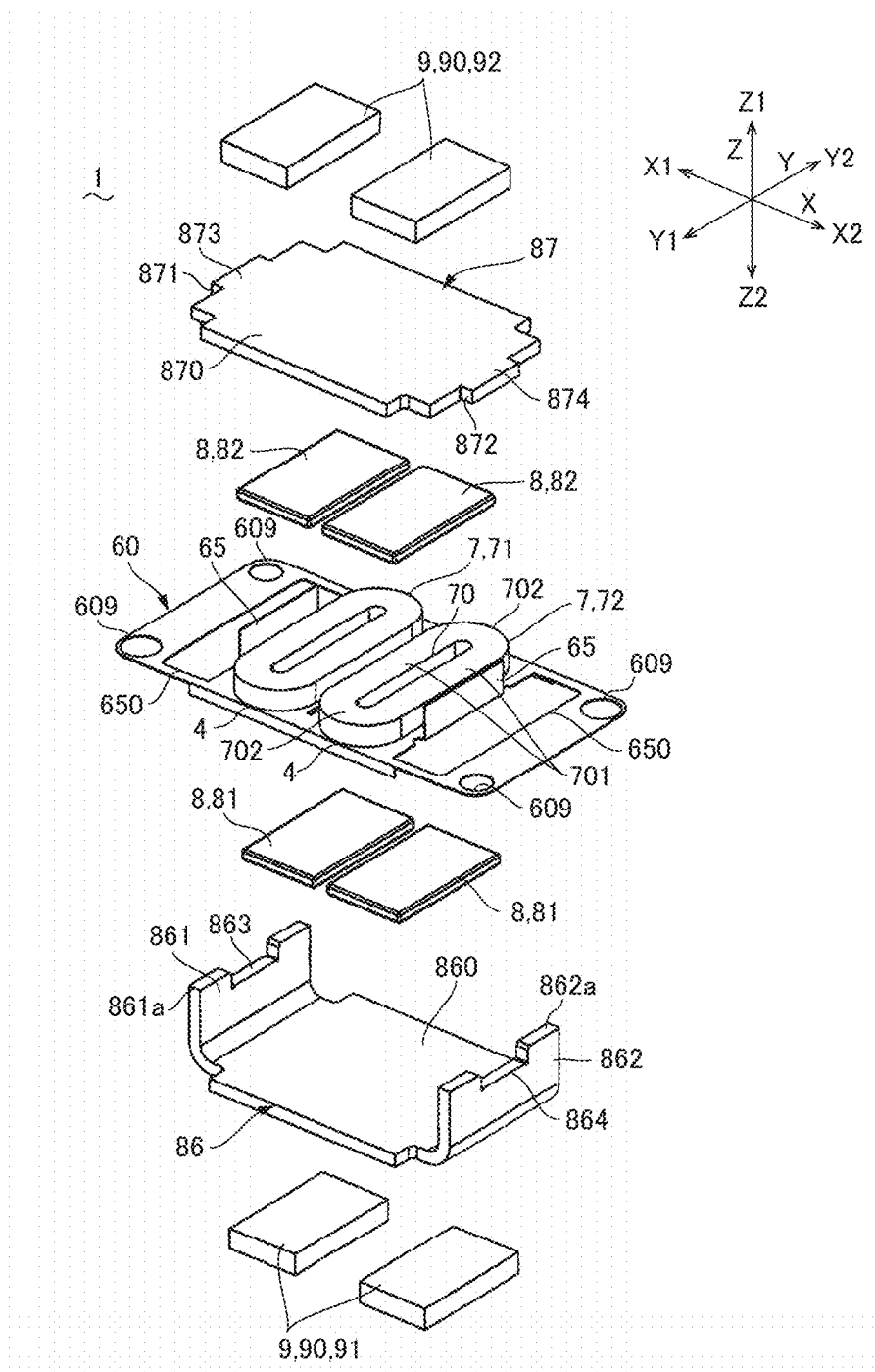
FIG. 5 is an exploded perspective view of a magnetic drive circuit illustrated in FIG. 2.

FIG. 5 is an exploded perspective view of the magnetic drive circuit 6 illustrated in FIG. 2. As illustrated in FIG. 3, FIG. 4, and FIG. 5, the magnetic drive circuit 6 includes coils 7 and permanent magnets 8 facing the coils 7 in the first direction Z. In the present embodiment, the coils 7 include two coils 71 and 72 arranged in parallel in the second direction X, and each of the two coils 7 is an oval-shaped air-core coil in which a pair of long sides 701 (effective side portions) arranged in parallel in the second direction X extend in the third direction Y. Each of the two coils 7 includes an oval-shaped air-core 70 extending in the third direction Y and inner edges of short sides 702 (ineffective side portions) located at both ends in the third direction Y have an arc shape. The coils 7 are held by the coil holder 60 and are provided on the side of the support body 2.

(Configuration of Coil Holder 60)

Figure 6:
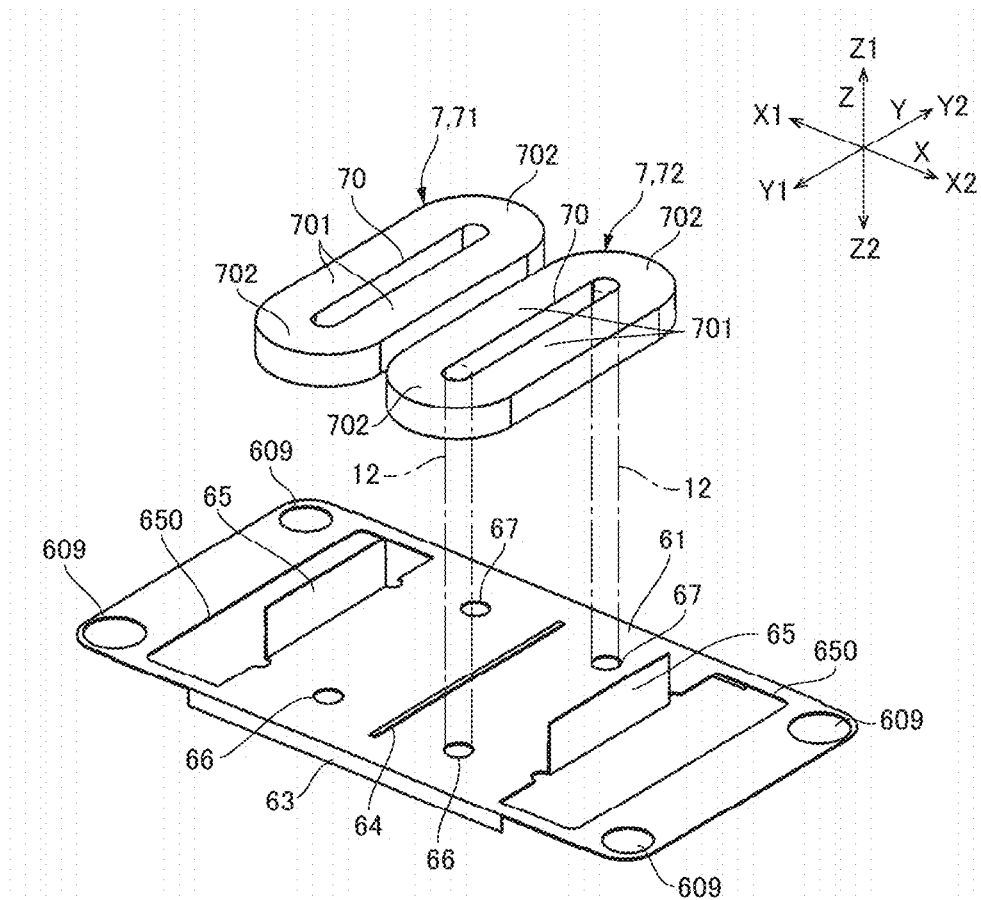
FIG. 6 is an exploded perspective view of a state in which a coil holder and a coil illustrated in FIG. 5 are separated.
Figure 7:
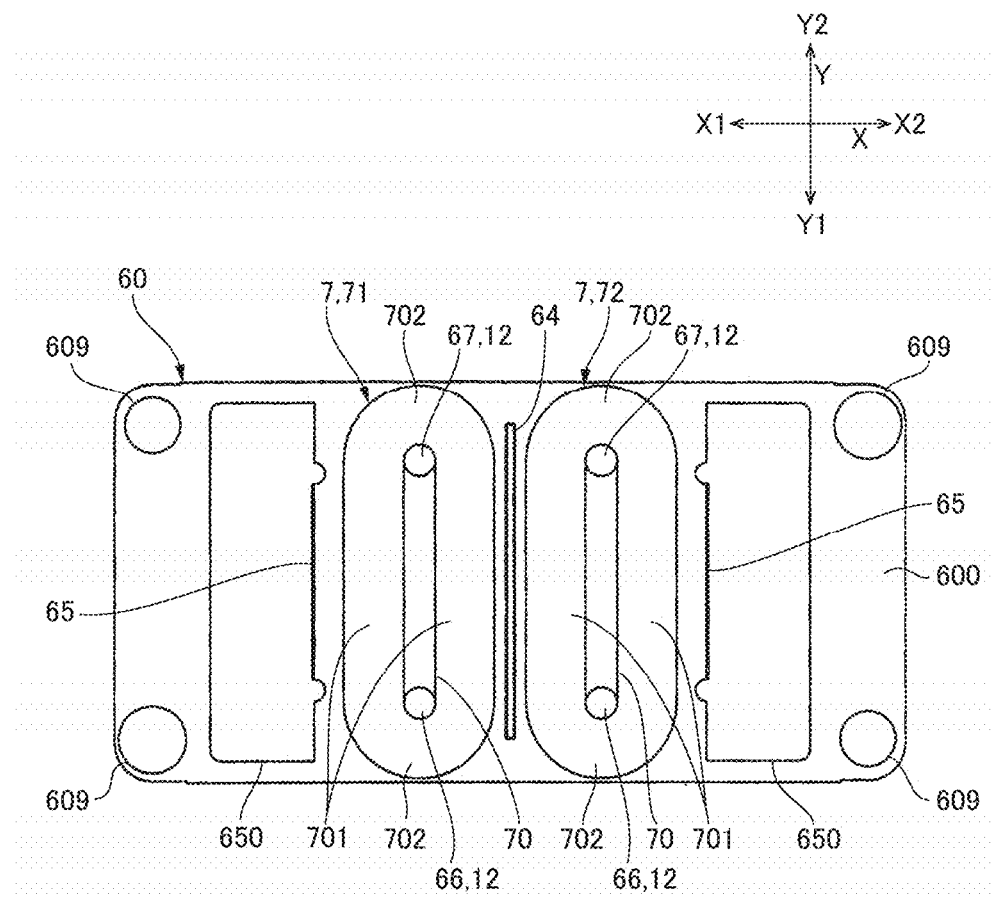
FIG. 7 is a plan view of a state in which the coil is positioned in the coil holder illustrated in FIG. 5.

FIG. 6 is an exploded perspective view of a state in which the coil holder 60 and the coils 7 illustrated in FIG. 5 are separated. FIG. 7 is a plan view of a state in which the coils 7 are positioned in the coil holder 60 illustrated in FIG. 5.

As illustrated in FIG. 2, FIG. 5, and FIG. 6, the coil holder 60 has a plate shape and surfaces of the coils 7 (the coils 71 and 72) on the other side Z2 in the first direction Z are fixed by an adhesive 4 to a surface 61 of the coil holder 60 on the one side Z1 in the first direction Z, in a state in which the air-cores 70 are directed in the first direction Z. The coil holder 60 is made of a non-magnetic material. Further, the coil holder 60 is made of a metal plate. In the present embodiment, the coil holder 60 is made of a non-magnetic stainless steel plate. The thickness of the coil holder 60 is 0.1 mm, for example.

Here, a first positioning hole 66 overlapping with the end of the air-core 70 of each of the two coils 7 on the one side Y1 in the third direction Y (inner side of the short side 702) and a second positioning hole 67 overlapping with the end of the air-core 70 on the other side Y2 in the third direction Y (inner side of the short side 702) are formed in the coil holder 60. Therefore, as illustrated in FIG. 6 and FIG. 7, when the coils 7 adhere to the coil holder 60, the coils 7 can be fixed to a proper position in the coil holder 60 by two pin-shaped jigs 12. More specifically, each of the two jigs 12 is passed through the first positioning holes 66 and the second positioning holes 67 of the coil holder 60, and both ends of the air-cores 70 of the coils 7 in the third direction Y make to be abutted against the jigs 12 to place the coils 7 at a predetermined position of the coil holder 60 and fix the coils 7 and the coil holder 60 by adhesion.

In the present embodiment, the coil holder 60 has a plate shape, and thus the ends of the coil holder 60 are bent in the first direction Z to constitute bend portions 63 for reinforcement. More specifically, the both ends of the coil holder 60 in the third direction Y constitute bend portions 63 for reinforcement extending in the second direction X while bending toward the other side Z2 in the first direction Z. Therefore, the coil holder 60 hardly bends in the first direction Z in a direction along the second direction X.

Further, a rib-shaped convexity 64 protruding to the one side Z1 or the other side Z2 in the first direction Z extends in the coil holder 60. More specifically, in the center of the coil holder 60 in the second direction X, the rib-shaped convexity 64 protruding to the one side Z1 in the first direction Z extends in the third direction Y between the two coils 7. Therefore, the coil holder 60 hardly bends in the first direction Z, in a direction along the third direction Y. In the present embodiment, the convexity 64 does not reach the edge of the coil holder 60 in the third direction Y. The convexity 64 is formed by press working or the like.

Further, plate-shaped abutting units 65 bent from the coils 7 to the one side Z1 in the first direction Z are formed at two positions in the coil holder 60 that are spaced apart in the second direction X and ends of the abutting units 65 on the one side Z1 in the first direction Z are located at the one side Z1 in the first direction Z from the coils 7. Here, the abutting units 65 are portions in which the coil holder 60 is cut and raised, and thus traces from the cutting and raising of the two abutting units 65 are formed as two openings 650 in the coil holder 60. In the present embodiment, the two abutting units 65 are provided at positions sandwiching, on both sides in the second direction X, a region where the two coils 7 are arranged, and the abutting units 65 are located close to the coils 7. Therefore, the abutting units 65 are bent toward the one side Z1 in the first direction Z at the edges of the openings 650 on the side of the coils 7. The openings 650 have a larger opening than the abutting units 65, and are utilized for coupling two yokes described later.

(Configuration of Movable Body 3)

As illustrated in FIG. 2, FIG. 3, FIG. 4, and FIG. 5, the movable body 3 includes a first yoke 86 including a first plate 860 facing the coils 7 on the other side Z2 in the first direction Z and a second yoke 87 including a second plate 870 facing the coils 7 on the one side Z1 in the first direction Z. In the present embodiment, two first permanent magnets 81 fixed by a method such as adhesion to a surface of the first plate 860 of the first yoke 86 facing the coils 7 and two second permanent magnets 82 fixed by a method such as adhesion to a surface of the second plate 870 of the second yoke 87 facing the coils 7, are provided as the permanent magnets 8. In this state, the first permanent magnets 81 face the long sides 701 of the coils 7 at the other side Z2 in the first direction Z via the coil holder 60, and the second permanent magnets 82 directly face the long sides 701 of the coils 7 at the one side Z1 in the first direction Z. Each of the first permanent magnets 81 and the second permanent magnets 82 are polarized and magnetized in the thickness direction (the first direction Z), and surfaces of the first permanent magnets 81 facing the coils 7 and surfaces of the second permanent magnets 82 facing the coils 7 are magnetized to different poles.

In the present embodiment, the first yoke 86 includes a first coupling plate 861 extending from the first plate 860 toward the one side Z1 in the first direction Z until a position overlapping with the second yoke 87 and coupled to the second yoke 87, and a second coupling plate 862 extending from the first plate 860 at the opposite side of the first coupling plate 861 with respect to the first permanent magnets 81 toward the one side Z1 in the first direction Z until a position overlapping with the second yoke 87 and coupled to the second yoke 87. Each of the first coupling plate 861 and the second coupling plate 862 is bent from ends on opposite sides of the first plate 860 in the second direction X toward the one side Z1 in the first direction Z. Thus, the first coupling plate 861 extends toward the one side Z1 in the first direction Z through one of the openings 650 of the coil holder 60 on the one side X1 in the second direction X with respect to the coils 7, and the second coupling plate 862 extends toward the one side Z1 in the first direction Z through the other of the openings 650 of the coil holder 60 on the other side X2 in the second direction X with respect to the coils 7.

In the present embodiment, the first coupling plate 861 and the second coupling plate 862 are coupled to an end of the second yoke 87 by welding. More specifically, the first coupling plate 861 is welded to a first side surface 871 of the second yoke 87 so that an end 861a of the first coupling plate 861 on the one side Z1 in the first direction Z overlaps with the first side surface 871 of the second plate 870 of the second yoke 87. Similarly, the second coupling plate 862 is welded to a second side surface 872 of the second yoke 87 so that an end of the second coupling plate 862 on the one side Z1 in the first direction Z overlaps with the second side surface 872 of the second plate 870 of the second yoke 87.

In one of the end 861a of the first coupling plate 861 and the first side surface 871, a convexity is formed that is fitted and welded to a concavity formed in the other one of the end 861a and the first side surface 871, and in one of the end 862a of the second coupling plate 862 and the second side surface 872, a convexity is formed that is fitted and welded to a concavity formed in the other one of the end 862a and the second side surface 872. In the present embodiment, a convexity 873 formed on the second plate 870 is fitted and welded to a concavity 863 formed in the end 861a of the first coupling plate 861, and a convexity 874 formed on the second plate 870 is fitted and welded to a concavity 864 formed in the end 862a of the second coupling plate 862.

(Configuration of Stopper)

As illustrated in FIG. 2, in the present embodiment, at the one side X1 in the second direction X with respect to the first coupling plate 861 of the first yoke 86 used for the movable body 3, the first wall unit 161 of the first cover member 16, the edge of one of the openings 650 of the coil holder 60, and an inner surface of the first wall unit 171 of the second cover member 17 face each other while forming a first abutted unit 118. Therefore, when the movable body 3 moves to the one side X1 in the second direction X due to a shock from the outside, the first coupling plate 861 constitutes a stopper that abuts against the first abutted unit 118 and restricts a movable range of the movable body 3 to the one side X1 in the second direction X.

Similarly, at the other side X2 in the second direction X with respect to the second coupling plate 862, the second wall unit 162 of the first cover member 16, the edge of one of the openings 650 of the coil holder 60, and an inner surface of the second wall unit 172 of the second cover member 17 face each other while forming a second abutted unit 119. Therefore, when the movable body 3 moves to the other side X2 in the second direction X due to a shock from the outside, the second coupling plate 862 constitutes a stopper that abuts against the second abutted unit 119 and restricts a movable range of the movable body 3 to the other side X2 in the second direction X.

Further, when the movable body 3 moves to the one side Y1 or to the other side Y2 in the third direction Y due to a shock from the outside, the first coupling plate 861 and the second coupling plate 862 abut against thick-walled units 16s and 17s provided at corners of the concavities 165 and 175 of the first cover member 16 and the second cover member 17 to constitute stoppers restricting a movable range of the movable body 3 in the third direction Y.

(Configuration of Connecting Body 90 and Viscoelastic Member 9)

As illustrated in FIG. 2, FIG. 3, FIG. 4, and FIG. 5, connecting bodies 90 contacting both the support body 2 and the movable body 3 are provided at portions where the support body 2 and the movable body 3 face each other, and the connecting bodies 90 have at least one of elasticity and viscoelasticity. In the present embodiment, the connecting bodies 90 are viscoelastic members 9 provided at positions where the support body 2 and the movable body 3 face each other in the first direction Z, and are elastically deformable in the first direction Z, the second direction X, and the third direction Y direction. Viscoelasticity is a property obtained by combining both viscosity and elasticity, and is a property remarkably observed in a polymeric material such as a gel-like member, a plastic, and a rubber. Therefore, various types of gel-like members can be employed as the viscoelastic members 9. Further, examples of the viscoelastic members 9 to be employed may include various types of rubber materials and a modified material thereof including natural rubber, diene-based rubber (such as styrene-butadiene rubber, isoprene rubber, and butadiene rubber), chloroprene rubber, acrylonitrile-butadiene rubber, non-diene rubber (such as butyl rubber, ethylene-propylene rubber, ethylene-propylene-diene rubber, urethane rubber, silicone rubber, and fluororubber), and a thermoplastic elastomer.

In the present embodiment, only the viscoelastic members 9 are connected to both the support body 2 and the movable body 3 as the connecting bodies 90. In the present embodiment, as the viscoelastic members 9, first viscoelastic members 91 are arranged at positions where the first yoke 86 of the movable body 3 and the second cover member 17 of the support body 2 face each other in the first direction Z, and second viscoelastic members 92 are arranged at positions where the second yoke 87 of the movable body 3 and the first cover member 16 of the support body 2 face each other in the first direction Z. More specifically, two of the first viscoelastic members 91 are arranged between the first plate 860 of the first yoke 86 and bottoms of the concavities 176 and 177 of the second cover member 17 and two of the second viscoelastic members 92 are arranged between the second plate 870 of the second yoke 87 and bottoms of the concavities 166 and 167 of the first cover member 16.

Here, the first viscoelastic members 91 are arranged in a compressed state in the first direction Z between the first plate 860 of the first yoke 86 and the bottoms of the concavities 176 and 177 of the second cover member 17 and the second viscoelastic members 92 are arranged in a compressed state in the first direction Z between the second plate 870 of the second yoke 87 and the bottoms of the concavities 166 and 167 of the first cover member 16. The first viscoelastic members 91 are adhered to a surface (the bottoms of the concavities 176 and 177 of the second cover member 17) contacting the support body 2, and are adhered to a surface (the first yoke 86) contacting the movable body 3. The second viscoelastic members 92 are adhered to a surface (the bottoms of the concavities 166 and 167 of the first cover member 16) contacting the support body 2, and are adhered to a surface (the second yoke 87) contacting the movable body 3.

In the present embodiment, the viscoelastic members 9 (the first viscoelastic members 91 and the second viscoelastic members 92) are, for example, a silicone-based gel having a penetration from 10 degrees to 110 degrees. The penetration is stipulated in JIS-K-2207 or JIS-K-2220, and the smaller this value, the harder the material. The viscoelastic members 9 have a linear or nonlinear stretch characteristic depending on their direction of extension and contraction. For example, when the viscoelastic members 9 are compressed and deformed by being pressed in their thickness direction (axial direction), the viscoelastic members 9 have a stretch characteristic where a nonlinear component (spring coefficient) is larger than a linear component (spring coefficient). On the other hand, if extended by being pulled in the thickness direction (axial direction), the viscoelastic members 9 have a stretch characteristic where the linear component (spring coefficient) is larger than the nonlinear component (spring coefficient). On the other hand, if being deformed, as in the present embodiment, in a direction crossing the thickness direction (axial direction) (shear direction), the viscoelastic members 9 are deformed in a direction where the viscoelastic members 9 are pulled and extended in whichever direction the motion is made, and in this case, the viscoelastic members 9 have a deformation characteristic where the linear component (spring coefficient) is larger than the nonlinear component (spring coefficient). Therefore, in the viscoelastic members 9, the spring force depending on the direction of motion is constant. Therefore, as in the present embodiment, a spring element in the shear direction of the viscoelastic members 9 is employed to improve a reproducibility of a vibration acceleration for an input signal, so that it is possible to achieve vibration with subtle nuances.

(Basic Operation)

When alternating current is applied to the coils 7 in the actuator 1 according to the present embodiment, the movable body 3 vibrates in the second direction X, and thus the center of gravity of the actuator 1 varies in the second direction X. Thus, a user can experience a vibration in the second direction X. At that time, an alternating current waveform applied to the coils 7 is applied to provide a difference between an acceleration at which the movable body 3 moves to the one side X1 in the second direction X and an acceleration at which the movable body 3 moves to the other side X2 in the second direction, and thus the user can experience a vibration having directionality in the second direction X. The actuator functions as a tactile device (a haptic device).

Main Effect of Present Embodiment

As described above, in the actuator 1 according to the present embodiment, the coils 7 are fixed on the surface 61 of the coil holder 60 on the one side Z1 in the first direction Z in a state in which the air-cores 70 are directed in the first direction Z, and thus even if an outer diameter and the like of the coils 7 vary, the coils 7 can be properly fixed to the coil holder 60 by the adhesive 4. Also, in this case, the coil holder 60 has a plate shape, and thus the size of the actuator 1 in the first direction Z can be reduced.

Further, the coil holder 60 is made of a non-magnetic material, and thus the magnetic flux from the permanent magnets 8 is interlinked to the coils 7 without being affected by the coil holder 60. Further, the coil holder 60 is made of a metal plate, and thus the heat generated by the coils 7 can be efficiently released via the coil holder 60. Further, the coil holder 60 is made of a stainless steel plate, and thus the coil holder 60 has sufficient strength even if the plate thickness is small.

Further, the first positioning holes 66 and the second positioning holes 67 overlapping with both ends of the air-cores 70 of the coils 7 are provided in the coil holder 60, and thus the coils 7 can be fixed at a proper position of the coil holder 60 by passing the pin-shaped jigs 12 through the first positioning holes 66 and the second positioning holes 67.

Further, the first permanent magnets 81 face the coils 7 at the other side Z2 in the first direction Z via the coil holder 60. Therefore, even if the movable body 3 moves to the one side Z1 in the first direction Z due to a shock or the like from the outside, the first permanent magnets 81 and the coils 7 do not come into direct contact with each other, and thus the coils 7 are not easily damaged. Further, the coil holder 60 includes the plate-shaped abutting units 65 bent from the coils 7 to the side of the second yoke 87. Therefore, even if the movable body 3 moves to the other side Z2 in the first direction Z due to a shock or the like from the outside, the second permanent magnets 82 and the coils 7 do not come into contact with each other, and thus the coils 7 are not easily damaged.

Further, the viscoelastic members 9 are arranged as the connecting bodies 90 contacting the support body 2 and the movable body 3 in portions where the support body 2 and the movable body 3 face each other in the first direction Z, and thus a resonance generated when the movable body 3 is driven is prevented by the viscoelastic members 9. At that time, the viscoelastic members 9 are deformed in the shear direction, and thus the viscoelastic members 9 have a deformation characteristic where the linear component is larger than the nonlinear component. Therefore, it is possible to improve the reproducibility of the vibration acceleration for the input signal, so that it is possible to achieve vibration with subtle nuances. Further, in the present embodiment, the support body 2 includes a plurality of members (the first cover member 16, the coil holder 60, and the second cover member 17) layered in the first direction Z, and thus an interval between positions where the support body 2 and the movable body 3 face each other in the first direction Z varies easily, however, the viscoelastic members 9 are arranged in a compressed state in the first direction Z, and thus the viscoelastic members 9 always contact the support body 2 and the movable body 3. Therefore, the viscoelastic members 9 surely follow the movement of the movable body 3. Further, surfaces of the viscoelastic members 9 contacting the support body 2 are adhered to the support body 2 and surfaces of the viscoelastic members 9 contacting the movable body 3 are adhered to the movable body 3, and thus the positions of the viscoelastic members 9 hardly shift. Therefore, the viscoelastic members 9 surely follow the movement of the movable body 3.

Further, the first cover member 16, the coil holder 60, and the second cover member 17 are fastened in the first direction Z by the screws 111 in which a screw axis extends in the first direction Z. Therefore, the viscoelastic members 9 can be compressed in the first direction Z when fastening the first cover member 16, the coil holder 60, and the second cover member 17 by tightening the screws 111. Further, the portions of the first cover member 16 and the second cover member 17 of the support body 2 contacting the viscoelastic members 9 are the concavities 166, 167, 176, and 177, and thus the positions of the viscoelastic members 9 hardly shift.

Further, the first yoke 86 and the second yoke 87 are arranged on both sides in the first direction Z while sandwiching the coils 7, and the first permanent magnets 81 and the second permanent magnets 82 are fixed to the first yoke 86 and the second yoke 87. Also, in this configuration, the first yoke 86 includes the first coupling plate 861 and the second coupling plate 862 extending toward the second yoke 87, and thus the first yoke 86 and the second yoke 87 can be coupled to each other during the assembly process.

Further, the convexity 873 formed on the second plate 870 is fitted and welded to the concavity 863 formed at the end 861a of the first coupling plate 861, and the convexity 874 formed on the second plate 870 is fitted and welded to the concavity 864 formed at the end 862a of the second coupling plate 862. Therefore, the first yoke 86 and the second yoke 87 can be bonded in a state where the first yoke 86 and the second yoke 87 are positioned by the concavities 863 and 864 and the convexities 873 and 874.

Further, the coil wire used for the coils 7 is electrically connected to the power supply substrate 15 fixed to the support body 2, and thus it is unlikely that the coils 7 are damaged when the end of the coil wire is pulled. Further, the power supply substrate 15 is fixed to the side surface corresponding to the long side when seen from the first direction Z among the side surfaces of the support body 2, and thus a power supply substrate having long dimensions can be used as the power supply substrate 15. Therefore, regardless of the direction, position, number, and the like of the coils 7, it is possible, even without pulling the coil wire over a long distance, to properly perform a process on the ends of the coils 7, for example, electric connection to the power supply substrate 15 is easily possible.

OTHER EMBODIMENTS

In the embodiment described above, the coils 7 are provided with the plate-shaped coil holder 60 only on the other side Z2 in the first direction Z, however, an aspect may be employed where the coils 7 are also provided with a plate-shaped coil holder similar to the coil holder 60 on the one side Z1 in the first direction Z and the coils 7 are arranged between the two coil holders.

In the embodiment described above, the two permanent magnets 8 (the first permanent magnets 81 and the second permanent magnets 82) are provided, however, at least an embodiment of the present invention may be applied to a case of an aspect where the coils 7 are provided with the permanent magnets 8 only on the one side Z1 in the first direction Z and with only the second yoke 87 on the other side Z2 in the first direction Z, for example.

In the embodiment described above, a gel-like member such as a silicone-based gel is employed as the viscoelastic members 9, however, a rubber or the like may be employed as the viscoelastic member. Further, in the embodiment described above, the viscoelastic members 9 are employed as the connecting bodies 90, however, an elastic member such as a spring may be employed.

In the embodiment described above, the coils and the holder are provided on the support body 2, and the permanent magnets and the yokes are provided on the movable body 3, however, at least an embodiment of the present invention may be applied to a case where the coils and the holder are provided on the movable body 3 and the permanent magnets and the yokes are provided on the support body 2. In the embodiment described above, at least an embodiment of the present invention is applied to the actuator 1 configured to drive the movable body 3 only in the second direction X, however, at least an embodiment of the present invention may be applied to an actuator 1 configured to drive the movable body 3 in the second direction X and the third direction Y.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An actuator, comprising:
    a movable body;
    a support body;
    a connecting body having at least one of elasticity and viscoelasticity and arranged at a position where the movable body and the support body face each other to contact both of the movable body and the support body; and
    a magnetic drive circuit comprising: an air-core coil provided on a first-side member among the movable body and the support body; and a permanent magnet provided on a second-side member among the movable body and the support body to face the air-core coil in a first direction, the magnetic drive circuit being configured to vibrate the movable body with respect to the support body in a second direction crossing the first direction;
    wherein
    in the first-side member, the air-core coil is fixed by an adhesive to a surface of a plate-shaped coil holder on a first side in the first direction while an air-core of the air-core coil is directed in the first direction,
    the permanent magnet comprises a first permanent magnet facing the air-core coil on a second side in the first direction via the coil holder and a second permanent magnet facing the air-core coil on the first side in the first direction,
    the second-side member comprises a first yoke with a surface thereof on the first side in the first direction, where the surface is fixed with the first permanent magnet and a second yoke with a surface thereof on the second side in the first direction, where the surface is fixed with the second permanent magnet, and
    the coil holder comprises a plate-shaped abutting unit extending from the surface of the coil holder on which the air-core coil is fixed to a side of the second yoke, facing a center portion of the air-core coil and mainly extending parallel to the air-core so that there is no contact between the air-core coil and the second permanent magnet when the movable body moves towards the air-core coil.

2. The actuator according to claim 1, wherein the coil holder is made of a non-magnetic material.

3. The actuator according to claim 2, wherein the coil holder is made of a metal plate.

4. The actuator according to claim 3, wherein the coil holder is made of a stainless steel plate.

5. The actuator according to claim 4, wherein an end of the coil holder extends in the first direction to form a bend portion for reinforcement.

6. The actuator according to claim 5, wherein a rib-shaped convexity protruding to the first side or the second side in the first direction extends in the coil holder.

7. The actuator according to claim 6, wherein the coil holder includes:
    a first positioning hole overlapping with an end of the air-core, the first positioning hole being on a first side in a third direction crossing the first direction and the second direction; and
    a second positioning hole overlapping with an end of the air-core, the second positioning hole being on a second side in the third direction.

8. The actuator according to claim 1, wherein the connecting body is a viscoelastic member arranged at a position where the movable body and the support body face each other in the first direction.

9. The actuator according to claim 8, wherein the connecting body adheres to both the support body and the movable body.

10. The actuator according to claim 9, wherein the viscoelastic member is arranged in a compressed state in the first direction.

11. The actuator according to claim 10, wherein the first-side member is the support body, and
the second-side member is the movable body.

12. The actuator according to claim 11, wherein the support body comprises a cover configured to hold an end of the coil holder.

13. The actuator according to claim 12, wherein the support body comprises a first cover member configured to support the end of the coil holder from the first side in the first direction, and a second cover member configured to hold the end of the coil holder from the second side in the first direction.

14. The actuator according to claim 1, wherein an end of the coil holder extends in the first direction to form a bend portion for reinforcement.

15. The actuator according to claim 1, wherein a rib-shaped convexity protruding to the first side or the second side in the first direction extends in the coil holder.

16. The actuator according to claim 1, wherein the coil holder includes:
   a first positioning hole overlapping with an end of the air-core, the first positioning hole being on a first side in a third direction crossing the first direction and the second direction; and
   a second positioning hole overlapping with an end of the air-core, the second positioning hole being on a second side in the third direction.

17. The actuator according to claim 1, wherein the connecting body is a viscoelastic member arranged at a position where the movable body and the support body face each other in the first direction.

18. The actuator according to claim 17, wherein the connecting body adheres to both the support body and the movable body.

19. The actuator according to claim 17, wherein the viscoelastic member is arranged in a compressed state in the first direction.

20. The actuator according to claim 1, wherein the first-side member is the support body, and
   the second-side member is the movable body.

21. The actuator according to claim 20, wherein the support body comprises a cover configured to hold an end of the coil holder.

22. The actuator according to claim 21, wherein the support body comprises a first cover member configured to support the end of the coil holder from the first side in the first direction, and a second cover member configured to hold the end of the coil holder from the second side in the first direction.

* * * * *